Nov. 10, 1925.
J. S. LANG
SHOCK ABSORBER
Filed Dec. 31, 1923
1,561,090
2 Sheets-Sheet 2
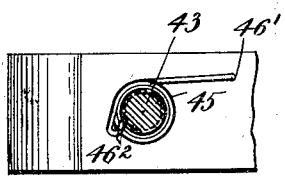
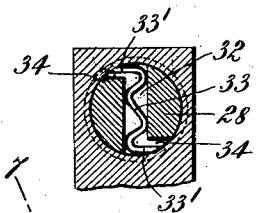
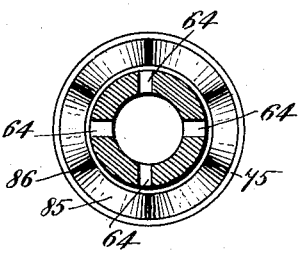
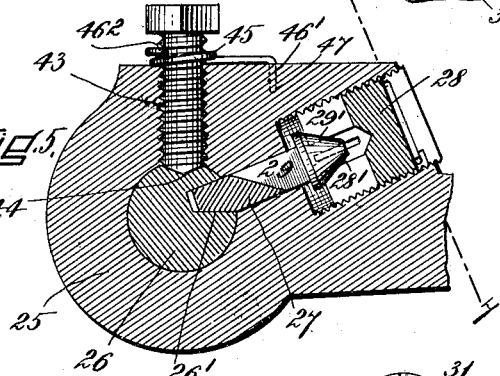
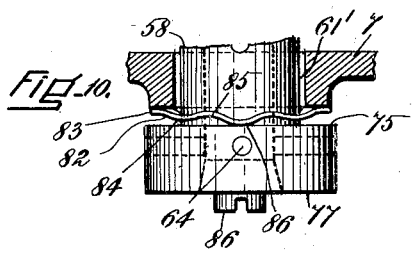
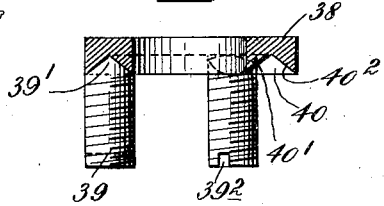
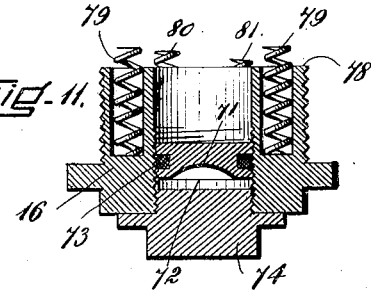
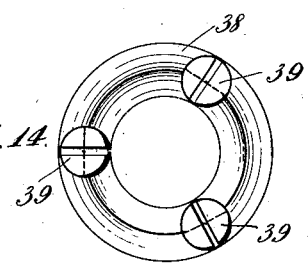
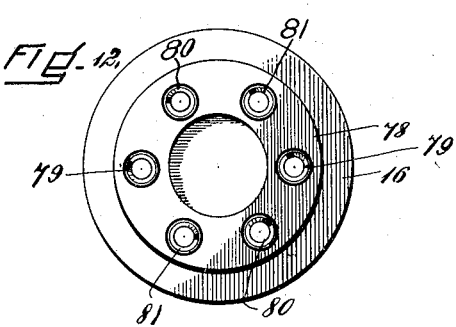
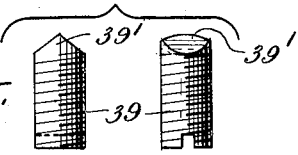
INVENTOR=
James S. Lang
By Craft + Thayer
ATTORNEYS=

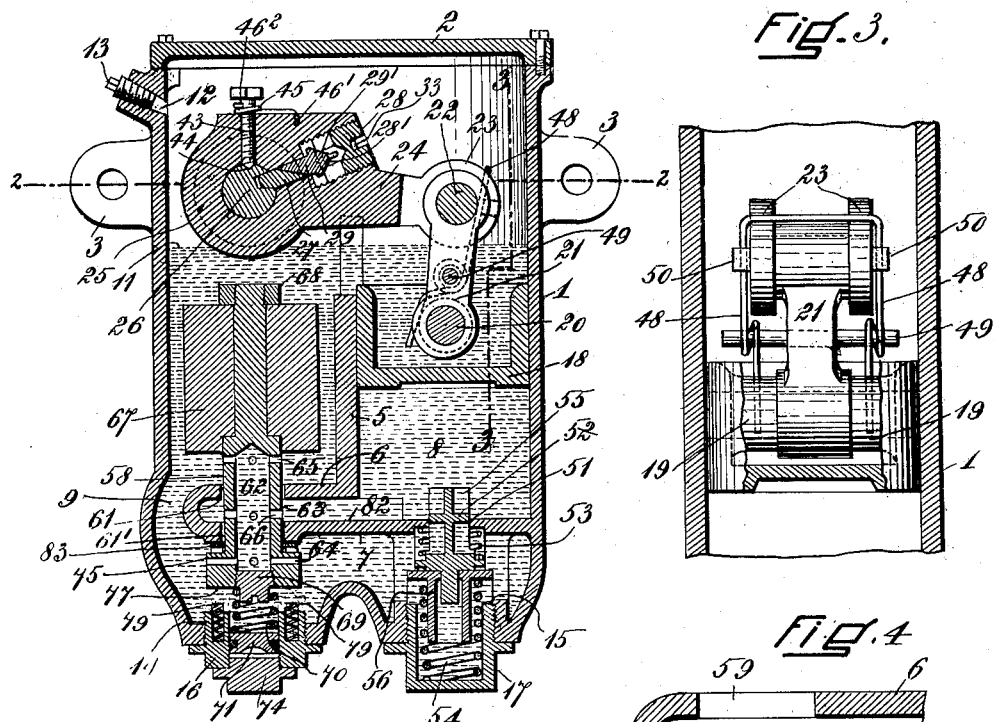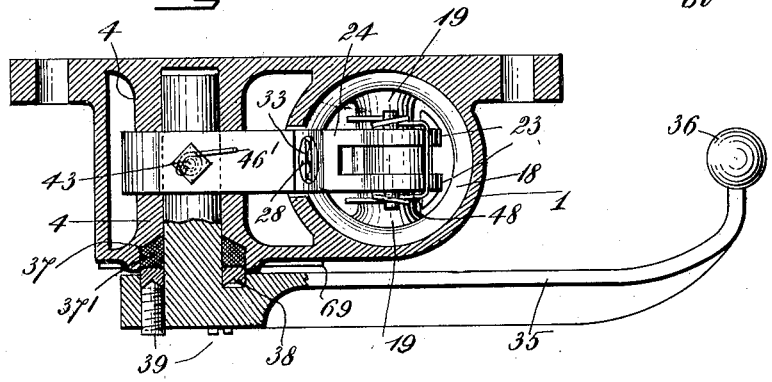

Patented Nov. 10, 1925.

1,561,090

UNITED STATES PATENT OFFICE.

JAMES S. LANG, OF WATERTOWN, MASSACHUSETTS.

SHOCK ABSORBER.

Application filed December 31, 1923. Serial No. 683,603.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention belongs to that class of shock absorbers which are especially adapted for motor vehicles, and in which the force required to pass a fluid through a constricted opening is utilized to prevent excessive vibration or rebound.

The object of the invention is to provide a generally improved shock absorber embodying means for automatically varying the area of the openings or passages through which the fluid is forced, and therefore the amount of force brought into play whenever such variation in the amount of force is required to effectually check the vibration or rebound of the vehicle body. It is also my object to provide a shock absorber having extreme sensitiveness and of relatively few parts; to provide improved means for holding the parts in place so that they may not be loosened by vibration; to provide improved means for preventing noise when the parts have become worn through use, and to provide means for neutralizing as far as possible the harmful effect of viscosity of the fluid used and capillary attraction between the fluid and the interior parts, thus permitting the use of a more viscous fluid without interfering with the sensitiveness of the absorber.

The invention can best be seen and understood by reference to the drawings in which a shock absorber embodying the invention is shown, and in which—

Figure 1 is a medial vertical cross section.

Fig. 2 is a horizontal section on the line 2—2 of Fig. 1.

Fig. 3 is a vertical section on the line 3—3 of Fig. 1.

Fig. 4 is a sectional view of the valve-controlled outlet leading from the compression chamber to the secondary chamber or reservoir.

Fig. 5 is a section on a larger scale of a portion of an internal rocker arm and shaft.

Fig. 6 is a view of the fastening used for preventing endwise movement of the shaft in relation to the rocker arm shown in Fig. 5.

Fig. 7 is a section on the line 7—7 of Fig. 5.

Fig. 8 is a view of the fastening used for preventing rotary movement of the shaft in relation to the rocker arm shown in Fig. 5.

Fig. 9 is a cross section of the weighted valve and view of annular spring which is interposed between the shoulder of the valve and one of its stops.

Fig. 10 is a section of the valve seating and partial view of the weighted valve with spring interposed between the shoulder of the valve and its stop.

Fig. 11 is a section showing an adjustable support for the weighted valve carrying elastic impact members, upon a larger scale than that shown in Fig. 1.

Fig. 12 is a top end view of the parts shown in Fig. 11.

Fig. 13 is a section of packing ring used in the packing gland surrounding the rocker shaft upon a larger scale than that shown in Fig. 2, attaching screws for the packing ring being shown in side elevation.

Fig. 14 is an end view of the parts shown in Fig. 13, and

Fig. 15 is a side elevation of the attaching screws shown in Fig. 13.

Referring to the drawings:—

1 represents a casing having a removable cover 2. Projecting laterally form the casing are lugs or ears 3 by which it may be secured to the body or framework of the vehicle. On the inside the casing is provided with spaced bearings 4 for a rock shaft later to be referred to. The interior of the casing is also provided with various members or partitions 5, 6, 7, respectively, which provide within it a compression chamber 8, and outside the chamber and immediately adjacent thereto a secondary or expansion chamber 9 with openings between the two chambers, certain of the partitions assisting in the valvular control of said openings.

The casing forms a receptacle for oil or other fluid contained within its respective chambers and maintained within the casing at about the level indicated at 11. The oil or other fluid is introduced into the casing at the top by way of the inlet 12 closed by the filling plug 13. At the bottom the casing is provided with outlet openings 14 and 15, closed by plugs or bonnets 16 and 17, respectively. These openings provide outlets for the oil and also openings through which the part above may be machined, and through which certain of the working parts may be introduced into the casing.

The compression chamber 8 is within a cylinder formed by the cooperation of the wall or partition 5 with the walls of the casing. Contained to reciprocate within the cylinder is a piston 18. The piston is provided with interior cheeks or hubs 19 within which a pin 20 is fixed to cross the space within the cheeks. Pivotally secured to the pin is a link or connecting rod 21 which is also pivotally secured to a pin 22 fixed in the spaced ends 23 of a rocker arm 24. The rocker arm 24 is provided with a hub 25, secured to a rock shaft 26 which turns within the spaced bearings 4 in the casing, the hub 25 occupying the space between the bearings.

Rotary movement of the hub 25 with relation to the shaft 26 is prevented by a key 27 which fits tightly into a keyway 26' in the shaft and is held in place by pressure exerted by a tightening plug 28 through the medium of a wedging piece 29. The keyway 26' in the shaft 26 is an inclined keyway and the end of the key 27 fitting therein is correspondingly inclined with the result that the pressure exerted through the wedging piece 29 causes the key to fit tightly in the keyway in the shaft. The end 29' of the wedging piece 29, against which the tightening plug has bearing, is made conical in shape and fits into the hollowed end 28' of the plug. The tightening plug is also deeply slotted with transverse slots 30 by which the forward hollowed end thereof is provided with a number of projections or jaws 31. At its opposite or outer end the head of the plug 28 is provided with a slot 32 by which it may be turned. The plug is threaded throughout its entire length and turns within an internally threaded bore formed in the hub. As the plug is turned for tightening it, its jaws 31 will press the wedging piece 29 firmly against the key 27, thereby locking the hub 25 upon the shaft 26. The heavy pressure of the conical end 29' of the wedging piece 29 exerted upon the hollowed end 28' of the plug will force its jaws 31 apart causing the threads upon their external surfaces to bite firmly into the threads upon the internal bore of the hub into which the plug fits, thereby holding the plug securely in place. To prevent the plug 28 gradually unscrewing from vibration, a locking wire 33 is laid in the slot 32. This wire is provided with oppositely-turned ends 33' extended to lie within channels 34 extending from the ends of the slot 32 and immediately adjacent the threads of the bore within which the plug is fitting. The ends 33' of the locking wire thus arranged press firmly into the treads of the bore and are so sharpened that any reverse movement of the plug will cause them to bite into the threads and thus prevent such reverse movement.

The shaft 26 extends through one of the bearings 4 and either keyed upon its outer end or constructed integrally therewith through a connecting hub 26' is an external rocker arm 35 provided with a ball 36 for making a ball and socket connection with any suitable means (not shown) for connecting it to the axle of the vehicle.

The opening through which the shaft 26 extends to the outside of the casing is provided with a stuffing box 37 adapted to hold packing 37' for the prevention of oil leakage. The packing 37' is provided with a follower ring 38 for keeping the packing tightly pressed into its box. Pressure is brought to bear upon the ring by a number of adjusting screws 39 passed through the hub 26'. The follower ring 38 is preferably contained in, or at least releasable into, the groove or recess 38' on the inner side of the hub 26'. As shown in Fig. 13, one side of the follower ring 38 is provided with an annular groove 40 having inclined sides 40', 40² which are fitted more or less closely by the beveled or wedge-shaped ends 39' of the adjusting screws 39. The other end of each of the adjusting screws 39 is provided with a slot 39² by which it may be turned for making adjustment. In operation the pressure to take up wear upon the packing is brought about by turning in the adjusting screws 39, and as the screws are turned the corners of the wedge-shaped ends of the screws will ride over the inclined sides of the annular groove in the ring 38, pressing the ring farther in against the packing than normal. As a half turn of each screw is completed the wedge-shaped end of the screw will again seat itself in the groove in the ring in a position advanced by one half turn from its previous adjusted position. The elasticity of the packing will retain the screws in their adjusted positions without any danger of their slacking back through vibration.

The pressure exerted by the adjusting screws 39 is in part transmitted through the ring 38 and the packing material 37' to the rear end of the stuffing box in the hub 4. This pressure tends to draw hub 25 against hub 4 and thereby withdraw the shaft 26 from within the hub 25. To counteract this tendency and to hold the shaft more accurately in its position within the hub there is provided a set screw 43 threaded through the hub 25 and having its pointed end enter a spotted cavity 44 in the shaft 26. To prevent the set screw 43 from unscrewing from vibration a locking wire 45 is provided. The locking wire 45 is formed into a helix tightly fitting the threads of the set screw 43, and encircles the latter one or more times. The locking wire 46 is prevented from rotating about the set screw by inserting one end 46' thereof in a hole 47 in the hub drilled to receive it. The other end 46² of the wire is sharply bent back in a reverse direction and is sharpened so that it will bite into the threads upon a reverse movement of the set screw 43 and thus prevent such reverse movement.

Continued movement of the parts will result in wear upon the pins 20 and 22 and link 21 which will result in noise or rattling, if not provided for. To prevent this, the pins 20 and 22 are kept in contact with the bearings in the link 21 by means of a spring 48 supported upon a pin 49 which is carried by link 21. The spring 48 is in a state of strain, one portion pressing against lugs 50 on the end 23 of the rocker arm 24, another portion pressing against the pin 48 as a fulcrum and the ends pressing against the hubs 19 in the interior of the piston 18. It is thus seen that through the medium of the pin 49 the link 21 is subjected to a side pressure which keeps its bored ends always in contact with the pins 20 and 22, thus preventing noise due to the contact between the pins and their bearings being broken and remade.

With the arrangement of parts as shown, it will be seen that any change in the relative positions of the axle and vehicle frame or body due to inequalities in the roadway will act to move the piston 18, which is raised or lowered as the case may be.

Referring now to the means for controlling the passage of oil or other fluid between the compression chamber 8 and the secondary or expansion chamber 9: The wall or partition 7 in the casing extends beneath the cylinder containing the compression chamber and forms the bottom wall of this chamber. Within the partition 7 at the lower end of the cylinder between the compression chamber and the secondary chamber which, as shown in Fig. 1, extends beneath the compression chamber, is located an opening 51. This opening is controlled by a valve, shown in its normal closed position in Fig. 1, provided with a closing disc or piston 52. When the piston 18 is raised the valve disc 52 is raised by the vacuum produced overcoming the gravity of the valve and compressing a light tensioned spring 53, permitting the oil to flow into the compression chamber 8 with only comparatively slight resistance. When the piston 18 is lowered, pressure is produced in the compression chamber 8 which acting on the top of the valve disc 52 will depress the disc against the presssure of a heavy spring 54 and will, if the pressure is sufficiently great, pass the disc completely through the opening 51 allowing the escape of the oil from the compresion chamber to the secondary chamber. To assist in the alignment of the valve with the opening 51 guiding fins 55 are provided which, cooperating with a valve support 56 form a positioning stop for the normal closed position of the valve. The pressure obtainable by the downward movement of the piston is determined by the pressure required to compress the spring 54 sufficiently to allow disc 52 to pass completely through the opening 51.

The partitions 6 and 7 cooperate with one another to form an extension passage or opening 57 from the lower end of the compression chamber. The partitions 6 and 7 are bored to provide an outlet from the compression chamber by way of openings 59 and 60, oppositely arranged (see Fig. 4), and which receive with a sliding fit a cylindrical valve 58, the bore of partitions 6 and 7 around the openings 59 and 60 forming a valve seat.

The fit of the cylindrical valve 58 in the openings 59 and 60 in partitions 6 and 7 is not oil-tight and under the pressure produced by the downward movement of the piston a certain amount of oil escapes from the pressure chamber through the openings 59 and 60 along the exterior surface of the valve 58, by way of the clearances 61, 61', influencing the movement of the valve in a manner subsequently to be described. As shown in Fig. 1, the valve is provided with a hollow cylindrical space 62 forming a passageway for the transference of liquid from the compression space to the secondary chamber, and vice versa. Ports 63, 64 and 65 are bored through the cylindrical walls of the valve. By means of these ports the passage of the fluid is controlled as movement of the valve takes place. In order that the valve may be free from friction and in perfect balance the ports 63, 64 and 65 are spaced equally around the circumference of the valve. In its normal position as shown in Fig. 1, there is free communication between the compression space 8 and the secondary chamber 9 by way of the wide open port 63, the interior space 62 and the ports 64 and 65. When the oil passes from the compression chamber 8 to the secondary chamber through the opening 57, its path is divided therein, one portion passing through the branch opening 59 finding its exit both through and around the valve 58, and the other portion passing through the branch opening 60 finding its exit both through and around the valve 58. The portion finding its exit through the valve enters the valve through ports 63 and leaves it through ports 64 and 65. The edge 66 of the valve seating at the upper surface of partition 7 forms a working valve edge in connection with the ports 63, closing the latter when the valve is depressed and opening them when the valve is raised.

The valve is extended at its upper end to form a spindle which is shouldered to receive a weight 67 fastened upon it by means of a lock nut 68 threaded thereon. In order to introduce the weight into the casing, the latter is provided with an opening on one side sufficiently large for the purpose, normally covered by a cover plate 69, after which the valve 58 is inserted from below through the opening 14.

At the lower end of the valve the cavity 62 is closed by a taper plug 69 which is also adapted to retain in position the end of a supporting spring 70. The closing plug 16 is bored to receive the lower end of the supporting spring 70, one end of which rests upon the adjustable spring support 71 which is threaded into the bore of the plug 16. The lower side of the spring support 71, as shown in Fig. 11, is provided with a slot 72 by which it may be turned. To enable the adjustment of the spring support to take place while the casing is filled with oil, the support is provided with a packing groove about its circumference which is fitted with a suitable packing 73. After the adjustment of the spring support 71 has been effected the lower end of plug 16 is closed by means of the auxiliary plug 74, thus preventing the loss of any oil which might leak past the packing 73.

The valve and its attached weight, supported in a state of substantial balance upon its supporting spring 70, is free to move in a vertical direction in response to such forces as may be brought to bear upon it. A stop to limit the upward movement of the valve after it has passed its full open position is provided by the shoulder 75 of the valve contracting with the partition 7. A stop to limit the downward movement of the valve after it has passed its closed position is provided by the lower end surface 77 of the valve 58 coming into contact with the upper end surface 78 of plug 16.

If the fluid used has considerable viscosity and there exists considerable capillary attraction between it and the material of which the absorber parts are made, the action of the weighted valve, which is delicately suspended, will be interfered with at the valve stops unless such viscosity and capillary attraction are compensated for. As is well known, when two surfaces wet with a viscous and adhesive fluid are pressed into close contact, a considerable force is required to pull them apart, and the nearer the surfaces are brought together the greater the force required to separate them. Therefore when the lower end surface 77 of the valve 58 (see Fig. 10) is brought into contact with the upper surface 78 of the plug 16, it will tend to stick there sufficiently to interfere with the movement of the valve. To neutralize the effect of the viscosity and adhesiveness of the oil, the plug 16 is bored on opposite sides with a number of equally spaced holes for the reception of the springs 79, 80 and 81. Of these springs, the springs 79 oppositely arranged extend above the surface 78 of the plug a distance approximately that at which the viscosity and adhesiveness of the fluid begins to interfere with the movement of the valve. The springs 80, also oppositely arranged, extend above the surface 78 slightly less than do the springs 79. The springs 81, also oppositely arranged, extend above the surface 78 slightly less than do the springs 80.

In operation as the valve 58 is depressed to the point at which the viscosity and adhesiveness between the stop surfaces 77 and 78 tend to prevent an upward movement of the valve, the springs 79 are compressed and as the valve is depresed still further springs 80 and 81 are compressed in succession, until when the valve is depressed into contact with its stop, the tendency of the viscosity and adhesiveness of the fluid, tending to hold the valve down, is opposed and substantially neutralized by the upward pressure of all the springs.

To neutralize the interference of the viscosity and adhesiveness of the fluid at the upper stop an annular elastic member 82 is interposed between the shoulder 75 of the valve 58 (see Fig. 10) and the lower surface of partition 7. Spring 82, annular in shape, has convexities 83, 84, 85 and 86 on its upper and lower surfaces, convexities 83 being in contact or nearly so with the lower side of partition 7 when the valve is in its normal open position, and convexities 86 resting upon the valve shoulder 75. As the valve is pressed upward against its stop the spring 82 is flattened, the convexities being brought more nearly into the same plane. As the valve still continues to rise convexities 84 come into contact with the shoulder 75 and convexities 85 come into contact with the under side of partition 7. As the movement continues the individual waves of which the spring is composed are flattened out between the two surfaces. It is thus seen that as the spring 82 is flattened an increasing resistance is encountered and the tendency of the spring to regain its normal shape will oppose and neutralize the tendency of the valve to stick in its upper position due to the viscosity and adhesiveness of the oil between the parts. As a further aid in preventing sticking of the valve while in its extreme upper position I utilize the annular jet or stream of oil which is directed downward through the opening 60 by way of the clearance 61' around the valve 58. This jet induced by the movement of the piston 18 impinging partly upon the upper portion of spring 82 and partly upon the shoulder 75 on the valve 58 tends to depress the valve slightly and furnishes a moving surplus of oil that assists in destroying the tendency of a vacuum to form between the parts when they are separated.

Reference will now be made to the effect upon the valve 58 of the flow of fluid through the openings 59 and 60.

As before intimated, the valve when unaffected by other forces takes its position as shown in Fig. 1 in a state of substantial suspensional balance upon its supporting spring 70, with stop spring 82 very lightly pressing against the under surface of partition 7, or if desired adjusted so that there is no contact between the spring and said surface in which position all the ports of the valve are open. Assuming now that a flow of liquid takes place from the compression chamber 8 through the openings 59 and 60 to the secondary chamber, this being brought about by a difference of the pressures in chambers 8 and 9 resulting from a movement of the piston 18, then a portion of the fluid discharged through the opening 57 and its branches 59 and 60 will enter the valve ports 63 and by divided paths in the cavity 62 find its exit to the secondary chamber by way of ports 64 and 65. The ports 64 and 65 are made substantially equal as respects their resistance to flow of fluid and therefore the valve 58 is unaffected by the flow which takes place through the ports 63, as the reactive effect of the flow through ports 64 and 65 is neutralized. Another portion of the fluid is discharged downward through opening 60 by way of the clearance 61' around the valve body and will impinge upon the stop spring 82 and the shoulder 75 in the lower end of the valve. Another portion of the fluid is discharged upwardly through the opening 59 by way of clearance 61 around the valve body and will impinge upon the lower end of the weight 67. That portion of the fluid which is discharged downward through the clearance 61' impinging directly upon the shoulder 75 of the valve exerts more force upon the valve when in its normal open position than the opposing discharge upward through the clearance 61 for the reason that the latter expends a portion of its energy upon the intervening fluid before impinging upon the lower end of weight 67. The resulting effect is that the flow of liquid through the clearances outside the valve body tends to depress the valve from its normal position, or if the adjustment is such that the shoulder 75 on the valve or spring 82 exerts a light pressure upon the lower side of partition 7, then such pressure will be decreased in amount.

The flow of liquid affecting the valve in the above manner is brought about by the movement of the piston 18 which by suitable means is connected with the vehicle axle. In this manner the movement of the vehicle axle is utilized to aid or supplement the action of the weight 67 and to whatever extent may be desired, by a proper proportioning of the parts and spring adjustment.

Reference will now be made to the function of the weight 67 and its attached valve, without reference to the effect of the flow of liquid through the clearance already described.

The weight 67 and the attached valve 58 may be considered as one, with reference to the effects of their inertia. The weight 67 and attached valve 58 in normal position are supported by the spring 70 in static balance as shown in Fig. 1, or if desired resting lightly against its upper stop. If depressed from this position and state the spring 70 will be compressed and upon release will return to its original position as the inertia of the weight and valve is overcome by the spring. If now the absorber casing 1 carrying the partitions 6 and 7 and spring support 71 be suddenly raised, the inertia of the weighted valve due to its considerable mass, will tend to cause it to lag behind the rise of the casing, compressing the spring 70 and resulting in a relative movement between the casing and the valve. This relative movement will close the ports 63. If the upward movement of the casing is not continued the compressed spring 70 will in turn overcome the inertia of the weighted valve, which will regain its original position reopening the ports 63.

The operation of the absorber is as follows: It will be assumed that all the parts of the shock absorber are in a normal position with the ports 63 open, the piston occupying a position about midway of the cylinder, and that the vehicle with its axle in normal relation to the body encounters a road surface having a large number of small inequalities, not in themselves sufficient to cause a rebound. In passing over these inequalities the axle is vibrated rapidly up and down as it follows the contour of the ground, with a small range of movement. The rocker arm 24 and the piston with it have a corresponding movement. Due to the fact that the annular flow of fluid along the exterior of the valve body through partitions 6 and 7 is rapidly intermittent and to a slight extent reversed in direction and on account of lack of pressure in the compression chamber on the upward stroke of the piston, the comparatively heavy weight 67 is only slightly influenced and the valve 58 remains substantially wide open, permitting a relatively free communication between the compression chamber and the secondary chamber 9. This permits a free vibration of the piston without interfering with the resiliency of the springs.

It will now be assumed that the vehicle encounters a raised obstruction in the roadway having an abrupt rise succeeded by a corresponding decline and of sufficient height and width under ordinary circumstances to produce a violent rebound. The vehicle and shock absorber with it reaches the obstruction with all its parts as before in substantially normal positions, and as the wheels mount the rise the axle is brought nearer to the body of the vehicle, compressing the vehicle springs. Simultaneously with the rise of the axle the hub 25 is turned, lifting the rocker arm 24, which raises the piston in the cylinder, and oil is drawn into the compression chamber below the piston from the secondary chamber by way of the valve 52, which is easily raised compressing the light spring 53, by way of the ports 63, and through the annular clearance jet passageways surrounding the body of the valve 58. If, as assumed above, the approach is quite abrupt, followed by an immediate decline, the inertia of the vehicle body will prevent its appreciable rise until the wheels have reached the top of the obstruction, when an incipient rebound will begin. The vehicle body then rises slightly from its previous line of travel and simultaneously the axle begins to move away from the body as the wheels pass the horizontal crown, moving the piston downward in the cylinder and discharging fluid through the valve ports 63 and through the annular jet clearances 61, 61'. As previously explained, the discharge of the fluid through the annular clearances 61, 61', tends to depress the valve from its normal position. On this tendency of the valve to close due to the impulse of the annular jets, there is also superposed a force tending to close the valve which is due to the inertia of the weight 67 in conjunction with the slight rise of the vehicle body as it passes the obstruction. The effect of the two forces mentioned will quickly and completely close the valve ports 63 preventing any substantial flow of oil through the valve 58. As the wheels pass over the crown of the rise therefore, the vehicle springs will be held in a state of compression and the rebound prevented, as the oil can only slowly escape from the compression chamber through the annular clearances surrounding the valves 52 and 58. In order that the pressure within the compression space 8 may not become so great as to endanger either the structure of the absorber or its attachments to the vehicle, it is not allowed to exceed a determinate amount through the action of the valve 52, which is opened by such excessive pressure, through the forcing of the valve head 52 through the opening 51 in the partition 7. If the obstruction is sufficiently high the lower end surface 77 of the valve 58 will, as the plug 16 rises, come successively into contact with the ends of springs 79, 80 and 81, compressing them and coming into contact with or close proximity to the upper surface 78 of the plug 16. The tendency of the valve to stick upon the surface 78, due to the viscosity and adhesiveness of the oil, is opposed by the pressure exerted by the springs 79, 80 and 81, and as the wheels descend on the further side of the obstruction the weighted valve tends to regain its first position and the ports 63 are partially opened. As the opening of the valve continues its shoulder 75 immediately above ports 64 is brought more and more into the influence of the downwardly-issuing annular jet surrounding the valve which tends to slow up the return of the valve and eases the impact of the upper stop spring 82 against the under surface of partitions 7. If the rise of the valve is sufficiently violent, however, the upper stop spring 82 will be compressed, whereupon any tendency of the valve to stick in its extreme upper position due to the viscosity and adhesiveness of the oil, is neutralized by the tendency of the spring 82 to regain its normal unflexed shape.

A case the opposite to the preceding will now be considered, in which the vehicle passes a wide and deep depression in the roadway.

The vehicle and shock absorber with it approaches as before with all its parts in substantially normal positions. Due to the inertia of the vehicle body, when the wheels go into the depression, the axle moves down and away from the vehicle body. As this movement takes place the piston moves downward in the cylinder, the fluid passing out through ports 63 and through the annular clearances surrounding the valves 52 and 58. The discharge of the fluid through the clearance between valve 58 and the opening 60 in partition 7 tends to depress the valve as before shown. This action is, however, opposed by the inertia of the weight 67, due to the slight fall of the vehicle body, with the result that the ports 63 remain nearly wide open, permitting the fluid to pass with little resistance to the secondary chamber. Due to the fact that the resistance to flow is slight, the piston moves downward with comparative freedom allowing the vehicle springs to expand beyond the normal state of compression, thus maintaining the vehicle body at nearly its former level. As the wheels pass the bottom of the hollow, the ports 63 are wide open and the vehicle springs remaining expanded maintain the vehicle body well up in position, and the flow of fluid through the valve ceases. The wheels now strike the rise on the opposite side of the hollow, and the piston regains its normal position in the cylinder, and the action in passing the top of the upward incline onto the level roadway beyond resembles somewhat that taking place in the case of the raised obstruction previously described.

Having thus fully described my invention, I claim and desire to secure by Letters Patent of the United States:—

1. In a fluid check shock absorber, a casing, a rock shaft mounted thereon, a rocker arm with hub embracing said shaft, means for keying the hub to the shaft comprising a member having a conical head, and a tightening plug threaded to turn in said hub and bear when tightened against said member, said plug having a hollow end into which the conical head of said member fits.

2. In a fluid check shock absorber, a casing, a rock shaft mounted thereon, a rocker arm with hub embracing said shaft, means for keying the hub to said shaft comprising a tightening plug threaded to turn within said hub, and a member against which said plug has bearing, said plug having a split end adapted to spread upon the tightening of said plug against said member.

3. In a fluid check shock absorber, a casing, a rock shaft mounted thereon, a rocker arm with hub embracing said shaft, means for keying the hub to said shaft consisting of a combined key and wedging piece, said wedging piece having a conical head, a tightening plug threaded to turn within said hub and have bearing against the conical head of said wedging piece, said tightening plug having a hollow split end into which said conical head fits and which operates to spread the end of said plug as said plug is tightened.

4. In a fluid check shock absorber, a casing, a rock shaft mounted thereon, a rocker arm with hub embracing said shaft, means for keying the hub to the shaft, a tightening plug threaded to turn within the hub retaining said keying means, said plug having a slot in the head thereof and a locking wire arranged within said slot adapted to engage the threads of said hub and thereby prevent loosening of said plug.

5. In a fluid check shock absorber, a casing, a rock shaft mounted thereon, a rocker arm with hub embracing said shaft, means for keying the hub to the shaft, a tightening plug threaded to turn within a threaded bore in the hub retaining the keying means, said plug having a slot in the head thereof with channels oppositely arranged and extending from the ends of said slot adjacent the threads of said bore in the hub, and a locking wire arranged within said slot with outturned ends lying within said channels and engaging the threads of said bore.

6. In a fluid check shock absorber having a fluid-containing casing, a rock shaft journaled to turn in bearings on said casing and extending through the side of the casing, a rocker arm outside the casing with an interposed hub between the arm and shaft, said casing have a packing gland on the side thereof and through which gland the shaft extends, a packing in said gland, a follower ring for said packing having on the outer side thereof an annular groove with inclined sides, and press screws having wedge-shaped ends passed through said hub and bearing against said packing ring, the wedge-shaped ends of the screws being contained within said annular groove.

7. In a fluid check shock absorber having a fluid-containing casing and a rock shaft journaled to turn in bearings on said casing and extending through the side of the casing, a rocker arm outside the casing with an interposed hub between the arm and shaft, said hub being provided on the inside thereof facing said casing with a recess, said casing having a packing gland in the side thereof opposite said recess in the hub and through which gland the shaft extends, a packing in said gland, a packing ring having on the outer side thereof an annular groove with inclined sides, and press screws passed through said recess in the hub and bearing against said packing ring, said screws being provided with wedge-shaped ends contained within the annular groove in said packing ring.

8. In a fluid check shock absorber for controlling the movement of relatively movable parts, a casing attachable to one of said parts and having within it a pressure chamber, a piston attachable to the other of said parts and reciprocable within said chamber, a flexible mechanism connecting said piston with the other of said parts and having within it a rock shaft and a link connection between said piston and shaft, a flexed spring, and means for mounting said spring on said link connection to have bearing against said piston and rock shaft.

9. In a fluid check shock absorber, a fluid-containing casing, a valve movable within said casing, a fixture arranged to define an extreme position of said valve, and an elastic means interposed between said valve and fixture adapted and arranged to be stressed by the valve as it approaches the extreme position defined by said fixture.

10. In a fluid check shock absorber, a fluid-containing casing, a valve movable within said casing, a fixture arranged to define an extreme position of said valve, and an elastic means carried by the valve adapted to be stressed by the valve as it approaches the extreme positon defined by said fixture.

11. In a fluid check shock absorber, a fluid-containing casing, a valve movable within said casing, a fixture arranged to define an extreme position of said valve, and an elastic means adapted and arranged to exert a gradually increasing resistance to movement of the valve as it approaches the extreme position defined by said fixture.

12. In a fluid check shock absorber, a fluid-containing casing, a valve movable within said casing, a fixture arranged to define an extreme position of said valve, and an elastic means presenting a plurality of striking points cooperating with one another to exert a gradually increasing resistance to movement of the valve as it approaches the extreme position defined by said fixture.

13. In a fluid check shock absorber, a fluid-containing casing, a valve movable within said casing, a spring supporting said valve, and an adjustable support for said spring accessible for adjustment from outside the casing.

14. In a fluid check shock absorber, a fluid-containing casing, a valve movable within said casing, a spring supporting said valve, and an adjustable support for said spring accessible for purposes of adjustment from outside the casing, said support being arranged also to close said casing against the escape of contained fluid when access is had thereto for purposes of adjustment.

15. In a fluid check shock absorber, a fluid-containing casing, a valve movable within said casing, a spring supporting said valve, an adjustable support for said spring arranged within the casing and accessible from outside the casing through an opening therein, a removable closure outside said adjustable support for said opening in the casing and through which opening access is had to said spring support for adjusting the same upon the removal of said closure, said spring support being also arranged whereby it may prevent the escape of contained fluid from the casing when said closure is removed.

16. In a fluid check shock absorber, a fluid-containing casing, a valve movable within said casing, a spring supporting said valve, a closing plug for said casing, and a support for said spring arranged within said plug and adjustable thereon for adjusting said spring.

17. In a fluid check shock absorber, a fluid-containing casing, a valve movable within said casing, a spring supporting said valve, a closing plug for said casing, said plug havng an opening therethrough from outside the casing, and a support for said spring adjustable within the bore of the plug closing the opening therethrough.

18. In a fluid check shock absorber, a fluid-containing casing, a valve movable within said casing, a spring supporting said valve, a closing plug for said casing, said plug having an opening therethrough from ouside the casing, a support for said spring adjustable within the bore of the plug closing the opening therethrough, and an auxiliary plug closing said opening through said plug closure arranged beyond said support and by the removal of which access may be had to said support.

JAMES S. LANG.